No. 656,123. Patented Aug. 14, 1900.
C. KEMPF.
APPARATUS FOR REFINING LARD.
(Application filed Aug. 4, 1899. Renewed June 13, 1900.)
(No Model.)
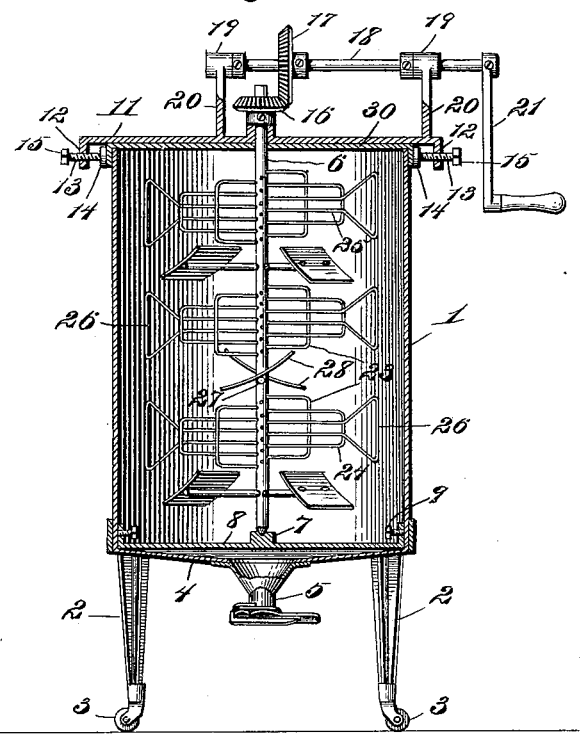
WITNESSES
Louis D. Heinrichs
Grayson D. Hitter
INVENTOR
Carl Kempf
By Victor J. Evans.
Attorney

UNITED STATES PATENT OFFICE.

CARL KEMPF, OF MILWAUKEE, WISCONSIN, ASSIGNOR OF ONE-HALF TO BERNHARD HUBER, OF SAME PLACE.

APPARATUS FOR REFINING LARD.

SPECIFICATION forming part of Letters Patent No. 656,123, dated August 14, 1900.

Application filed August 4, 1899. Renewed June 13, 1900. Serial No. 20,185. (No model.)

*To all whom it may concern:*

Be it known that I, CARL KEMPF, a citizen of the United States, residing at Milwaukee, in the county of Milwaukee and State of Wisconsin, have invented certain new and useful Improvements in Lard-Refiners, of which the following is a specification.

My invention relates to lard-refiners; and its object is to provide an apparatus which will thoroughly agitate the lard to purify and whiten it and to remove the strong and offensive odor found in lard which is imperfectly refined.

The invention comprises a tank or vessel to contain the lard, and a revolving shaft carrying blades or beaters of improved construction.

A further feature of the invention is to so construct the bottom of the tank or receptacle and to so locate the discharge-faucet with relation thereto as to insure a complete emptying of the tank, thus avoiding any loss or accumulation of lard upon the tank-bottom.

The construction of the refiner will be fully described hereinafter in connection with the accompanying drawings and defined in the appended claims.

In the drawings, Figure 1 is a sectional side elevation of a lard-refiner embodying the invention, and Fig. 2 is a perspective view of the revoluble shaft and blades or beaters and their supporting and operating means removed from the vessel.

The reference-numeral 1 designates the tank or vessel, preferably made of galvanized iron and of cylindrical form. This vessel is supported upon legs 2, which are equidistant from one another, and preferably provided at their lower ends with casters or rollers 3. The bottom 4 of the vessel is of concavo-convex form and provided with a central discharge-faucet 5, having a strainer for straining the lard. This construction permits the entire contents of the vessel to flow through the faucet to avoid the waste incident to the use of a faucet located at the side of the vessel, above the bottom thereof. The legs 2 are of such length as to support the vessel a convenient distance above the floor for the placing of a bucket below the discharge-faucet.

6 designates a vertical shaft supported at its lower end in a central bearing 7 of a cross-bar 8, secured removably within the vessel 1 and near the bottom thereof by set-screws 9 of sufficient length to adapt the cross-bar to vessels of different diameter. The set-screws 9 extend through openings formed in brackets 10, projecting upwardly from the ends of the cross-bar. The upper end of the shaft 6 extends through a central opening in a cross-bar 11, formed at its ends with depending lugs 12, which are adapted to overlap the top edge of the vessel 1 at diametrically-opposite points and be secured thereto removably by set-screws 13, extending through the lugs. The inner ends of the set-screws 13 are formed with disks 14, adapted to bear against the outer surface of the vessel 1, and their outer ends have the usual heads 15 for turning the screws by means of a suitable wrench.

Upon the upper end of the shaft 6 is mounted a horizontal bevel gear-wheel 16, which meshes with a vertically-disposed bevel gear-wheel 17, mounted upon a horizontal shaft 18, supported in bearings 19, formed in the upper ends of parallel vertical brackets 20, projecting from the cross-bar 11. This shaft may be revolved by a hand-crank 21, as shown in the drawings, or from any suitable source of power by means of an endless belt and a pulley upon the shaft. (Not shown.)

Upon the shaft 6, between the cross-bars 8 and 11, are arranged a series of beaters for whipping and stirring the lard and a plurality of adjustable blades or shovels for raising and agitating the lard. The construction of these features constitutes an important feature of the invention and will now be described.

The shaft 16 is formed with radial openings 22, into which are inserted the ends of the beaters 23, 24, and 25 and the inner ends of the rods 27, the latter carrying blades or shovels 28. The beaters 23, 24, and 25 are arranged in overlapping groups and they project radially from the shaft, as shown. The beater 23 is formed with a single piece of wire bent into the form of a bail having its ends secured in the openings of the shaft. The beater 24 is also of bail form of greater width, but less height than the beater 23. The third beater 25 of each group projects laterally beyond the bail 24, but is narrower than the latter, except at its outer end, which is bent to form a triangular head or loop 26.

From the construction and relative arrangement of the beaters above described it will be seen that the beaters of each group revolve in different horizontal planes and that their outer ends also describe different circles in their revolution, the result being that the oily contents of the vessel are thoroughly agitated, and thus quickly whitened and purified. Any desired number of these groups of beaters may be employed, arranged in sets, and projecting radially, as shown.

Interposed between the sets of beaters are the elevating blades or shovels 28, riveted to the outer edge of the rods 27, said rods being held adjustably in the adjacent openings 22 of the shaft 6 by set-screws 29, by means of which the blades may be set at any desired angle. These blades or shovels are arranged opposite each other in pairs, the members of each pair being inclined in opposite directions to raise the lard into the paths of the rotary beaters.

The whipping and agitation of the lard by the means above described not only results in whitening and refining the product without the aid of chemicals, but also produces a lard of rich solid consistency which will not crumble and which will retain its purity against climatic and atmospheric action.

I preferably employ a semicircular or half cover 30 for the vessel 1 to permit of the introduction of a strainer-spout of a lard-press and to prevent overflow or splashing of the contents of the vessel.

I claim—

1. A lard-refiner comprising a tank or vessel; a cross-bar removably secured at its ends within the vessel near the bottom thereof and having a central bearing; an upper cross-bar removably secured to the top edge of the vessel; a vertical shaft supported revolubly by said cross-bars; a series of overlapping beaters projecting radially from the shaft; pairs of adjustable elevating-blades; and means for revolving the shaft, beaters, and blades.

2. In a lard-refiner, the combination with a tank or vessel, of a vertical shaft supported in bearings centrally within the vessel; overlapping beaters of varying width and length projecting in radial groups from the shaft; adjustable, radial, elevating-blades arranged upon the shaft adjacent to the groups of beaters; and means for revolving the shaft, beaters, and blades.

3. In a lard-refiner, the combination with a tank or vessel, of a revoluble shaft formed with vertical rows of radial openings; beaters arranged in overlapping groups, and each comprising a single piece of wire bent to form loops or bails and having its ends inserted into the openings in the shaft and arranged between the beaters; adjustable blades or shovels carried by the shaft; and means for revolving said shaft.

4. In a lard-refiner, the combination with a vessel formed with concavo-convex bottom, having a central opening, of a faucet fitted to said opening; a revoluble shaft supported centrally within the vessel, and carrying beaters of varying width and length, arranged in groups and projecting radially from the shaft and comprising loops or bails having their ends secured to the shaft.

In testimony whereof I affix my signature in presence of two witnesses.

CARL KEMPF.

Witnesses:
CARL E. O. BAUR,
BERNHARD HUBER,